United States Patent
Fiorenza et al.

(10) Patent No.: US 6,356,003 B1
(45) Date of Patent: Mar. 12, 2002

(54) DIRECT CURRENT MOTOR

(76) Inventors: John Fiorenza, 3580 Slinger Rd., Slinger, WI (US) 53086; Allen Jeske, 608 Knoll Terrace Dr., Waterford, WI (US) 53185; Felix Belkin, 2220 W. Skyline Rd., Glendale, WI (US) 53209

( * ) Notice: Subject to any disclaimer, the term of this patent is extended or adjusted under 35 U.S.C. 154(b) by 0 days.

(21) Appl. No.: 09/415,976

(22) Filed: Oct. 12, 1999

Related U.S. Application Data

(60) Provisional application No. 60/125,266, filed on Mar. 19, 1999.

(51) Int. Cl.[7] .............................................. H02K 39/38
(52) U.S. Cl. .................. 310/239; 310/90; 310/268; 310/241; 310/89; 310/179
(58) Field of Search ........................ 310/239, 90, 268, 310/71, 241, 60 A, 61, 62, 63, 89, 179

(56) References Cited

U.S. PATENT DOCUMENTS

| | | | |
|---|---|---|---|
| 303,866 A | * | 8/1884 | Langley |
| 1,416,256 A | | 5/1922 | Borger |
| 3,500,095 A | | 3/1970 | Keogh ........................ 310/268 |
| 3,525,008 A | * | 8/1970 | Burr ............................ 310/268 |
| 3,648,360 A | | 3/1972 | Tucker ......................... 29/597 |
| 4,082,971 A | * | 4/1978 | Miyake et al. .............. 310/114 |
| 4,347,455 A | | 8/1982 | Major et al. |
| 4,501,986 A | | 2/1985 | Gheorghe ................... 310/268 |
| 4,510,409 A | | 4/1985 | Kanayama .................. 310/268 |
| 4,593,220 A | | 6/1986 | Cousins et al. |
| 4,677,333 A | * | 6/1987 | Auzolat et al. ............. 310/239 |
| 4,769,572 A | | 9/1988 | Voigt |
| 4,823,039 A | | 4/1989 | Lynch ........................ 310/268 |
| 4,910,790 A | | 3/1990 | Kershaw |
| 5,095,236 A | | 3/1992 | Walsh |

(List continued on next page.)

FOREIGN PATENT DOCUMENTS

| | | | |
|---|---|---|---|
| DE | G 93 05 152.2 | 7/1993 | |
| DE | 196 42 665 A 1 | 4/1998 | |
| EP | 0 309 076 A2 | 3/1989 | |
| EP | 0 398 610 A2 | 11/1990 | |
| EP | 0 884 826 A2 | 12/1998 | ............ H02K/5/20 |
| FR | 12232438 | 10/1960 | |
| FR | 1426280 | 4/1966 | |
| FR | 2 438 935 | 5/1980 | |
| FR | 2 726 701 | 5/1996 | |
| GB | 955408 | 4/1964 | |
| GB | 2 222 320 | 2/1990 | |
| WO | WO95 17779 | 6/1995 | |

OTHER PUBLICATIONS

JP 07 288952 A (Matsushita Electric Ind Co Ltd Oct. 31, 1995.

*Primary Examiner*—Nestor Ramirez
*Assistant Examiner*—Thanh Lam
(74) *Attorney, Agent, or Firm*—Michael Best & Friedrich LLP

(57) ABSTRACT

A motor includes a shaft, at least one bearing, a rotor, a stator, and a brush carrier. The bearing is located adjacent to the shaft. The rotor is interconnected to the shaft and magnetically interacts with the stator. The brush carrier is releasably interconnected to the rotor and/or stator such that the brush carrier can mechanically disconnect from the rotor and/or stator without disturbing a bearing and other motor elements. By disconnecting the brush carrier from an endbell and viewing the commutator surfaces through an endbell aperture, the commutator surfaces of the motor are inspected. Since more than one winding portion of the armature can act as a commutating surface, motor assembly is simplified and the motor has a long useful life. A motor including more than one brush carrier is also provided. Each brush carrier is releasably interconnected to the rotor and/or stator such that either brush carrier can be mechanically disconnected from the rotor and/or stator without disturbing other motor elements.

44 Claims, 14 Drawing Sheets

U.S. PATENT DOCUMENTS

| | | | | |
|---|---|---|---|---|
| 5,097,167 A | * | 3/1992 | Kanayama et al. | 310/201 |
| 5,144,183 A | * | 9/1992 | Farrenkopf | 310/268 |
| 5,172,465 A | | 12/1992 | Stewart, Sr. | |
| 5,182,482 A | | 1/1993 | Burke | 310/89 |
| 5,345,132 A | * | 9/1994 | Sasaki et al. | 310/239 |
| 5,487,213 A | | 1/1996 | Hult et al. | |
| 5,608,280 A | | 3/1997 | Tamemoto et al. | |
| 5,650,676 A | | 7/1997 | Blumenberg | |
| 5,659,211 A | | 8/1997 | Blanchet | |
| 5,689,148 A | | 11/1997 | Rubinchik | |
| 5,757,095 A | | 5/1998 | Ohmi et al. | |
| 5,804,905 A | | 9/1998 | Knoerzer | 310/268 |
| 5,994,815 A | * | 11/1999 | Takagi et al. | 310/237 |

\* cited by examiner

DIRECT CURRENT MOTOR

RELATED REFERENCE

This application claims the benefit of U.S. Provisional Application No. 60/125,266, filed Mar. 19, 1999, entitled Direct Current Motor, which is incorporated by reference herein.

BACKGROUND OF THE INVENTION

1. Technical Field of the Invention

The present invention relates to direct current motors and more particularly to at least one brush carrier that allows brushes to be disconnected from a direct current motor for servicing without disturbing motor bearings.

2. Description of the Related Art

Direct current motors commonly use a brush carrier to hold brushes in their proper positions. In some motors, brush alignment is critical to motor performance because direct current feeds through brushes to commutator segments. A misalignment between brushes and commutator segments can diminish motor performance and lead to excessive motor sparking.

In some brush type direct current motors, brushes freely slide along the curvature of the commutator segments. The frictional engagement between the brushes and the commutator segments can cause brushes and commutator surfaces to wear. Moreover, brushes often freely ride over uneven commutator surfaces that promote brush vibration and motor sparking. Both conditions shorten the useful life of brushes and commutator segments.

In many cases, it is necessary to remove brushes to inspect brush and commutator surfaces for wear. In one approach, brushes are removed by disassembling brush holders. During disassembly each brush is individually removed from its respective brush holder and thereupon examined. The disadvantages of this system and others known in the art include the excessive time, skill, and expense needed to remove, inspect, and reassemble each brush and brush holder. In addition, brush removal may not necessarily ensure access to commutator surfaces and may disturb motor bearings. When motor bearings are disturbed, the motor may become unbalanced which often leads to a timely and a costly repair. Generally, great care must be taken to realign disturbed bearings, which adds to the time and the expense required to service direct current motors.

With growing commercial preferences for motors that are easy to maintain, there is demand for a brush carrier system and method that facilitates motor service and repair without compromising motor performance.

SUMMARY OF THE INVENTION

The invention provides an apparatus and a method that allow brushes to be mechanically disconnected from a motor without disturbing a bearing and other motor parts. The apparatus comprises a shaft, at least one bearing, a rotor, a stator, and a brush carrier. The bearing is located adjacent to the shaft. The rotor is interconnected with the shaft and magnetically interacts with the stator. Preferably, either the stator and/or rotor includes a winding. The brush carrier is releasably interconnected with the rotor and/or stator such that the brush carrier can be mechanically disconnected from the rotor and/or stator without disturbing the bearing and other motor parts.

An endbell having a bearing retainer is contemplated in another aspect of the invention. The endbell and bearing retainer may be a unitary or multiple piece construction that provides some shaft support. It is further envisioned that an end surface of the winding may act as a commutator surface. In this aspect, a brush directly engages a portion of the winding. Many alternative aspects of the apparatus are also envisioned and are described below.

Another aspect of the invention involves a method for inspecting a commutator surface of a motor. The method comprises the steps of providing a motor comprising a shaft, at least one bearing, a rotor, a stator, and a brush carrier; partially disconnecting the brush carrier from an endbell having at least one aperture; and then, viewing the commutator surface through the aperture. Preferably, disconnecting the brush carrier from the endbell does not disturb the bearing, and preferably, the rotor and/or the stator include at least one winding having a portion that acts as a commutator surface.

In yet another aspect of the invention, a second brush carrier is releasably interconnected to an opposite side of the rotor and/or stator from the first brush carrier. Each brush carrier can be mechanically disconnected from the rotor and/or stator without disturbing the bearings and other motor parts.

The disclosed apparatus and method provide a brush carrier that is easy to assemble and disassemble from a motor without disturbing a bearing and other motor parts. The apparatus and method easily align brushes with commutator surfaces and simplify maintenance programs. The brush carrier is compatible with many motor types besides the wave wound motor of the preferred embodiment.

These features as well as other advantages of the invention will become apparent upon consideration of the following detailed description and accompanying drawings of the embodiments of the invention described below.

DETAILED DESCRIPTION OF THE INVENTION

Figure 1:
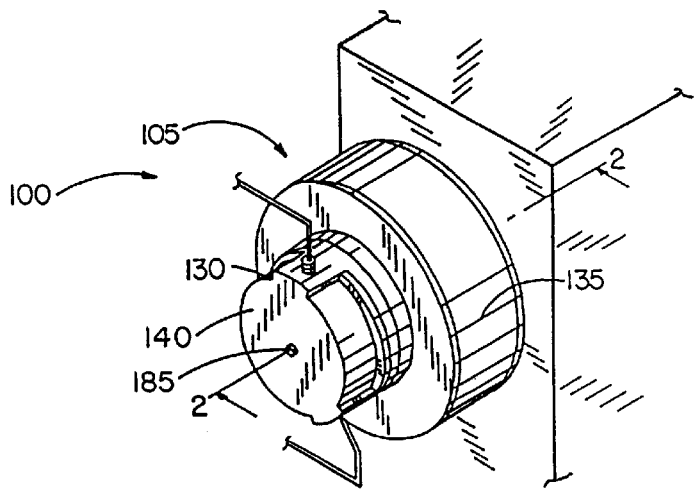
FIG. 1 is a perspective view of a first embodiment of the invention.

In the drawings, depicted elements are not necessarily drawn to scale, and the same reference numbers through several views designate alike and similar elements.

I. Structure

Figure 2:
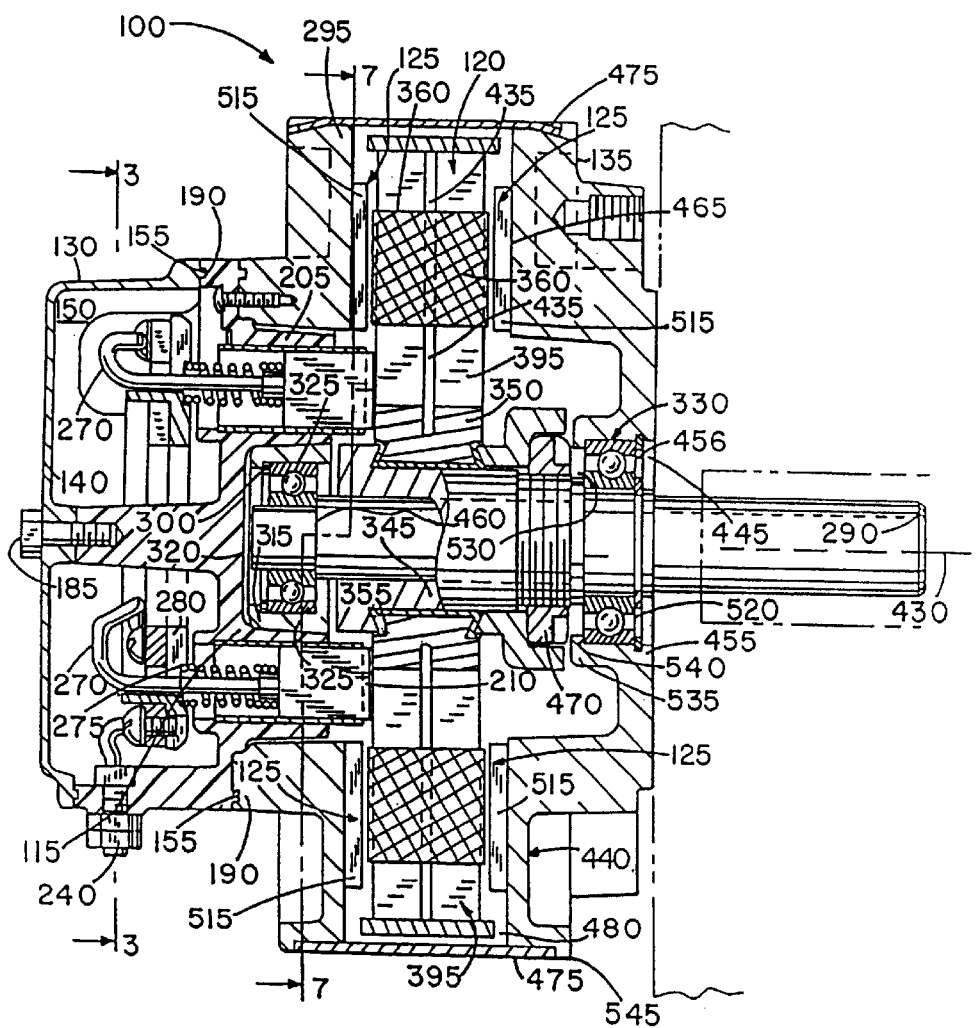
FIG. 2 is a cross-sectional view taken along line 2—2 of FIG. 1.
Figure 4:
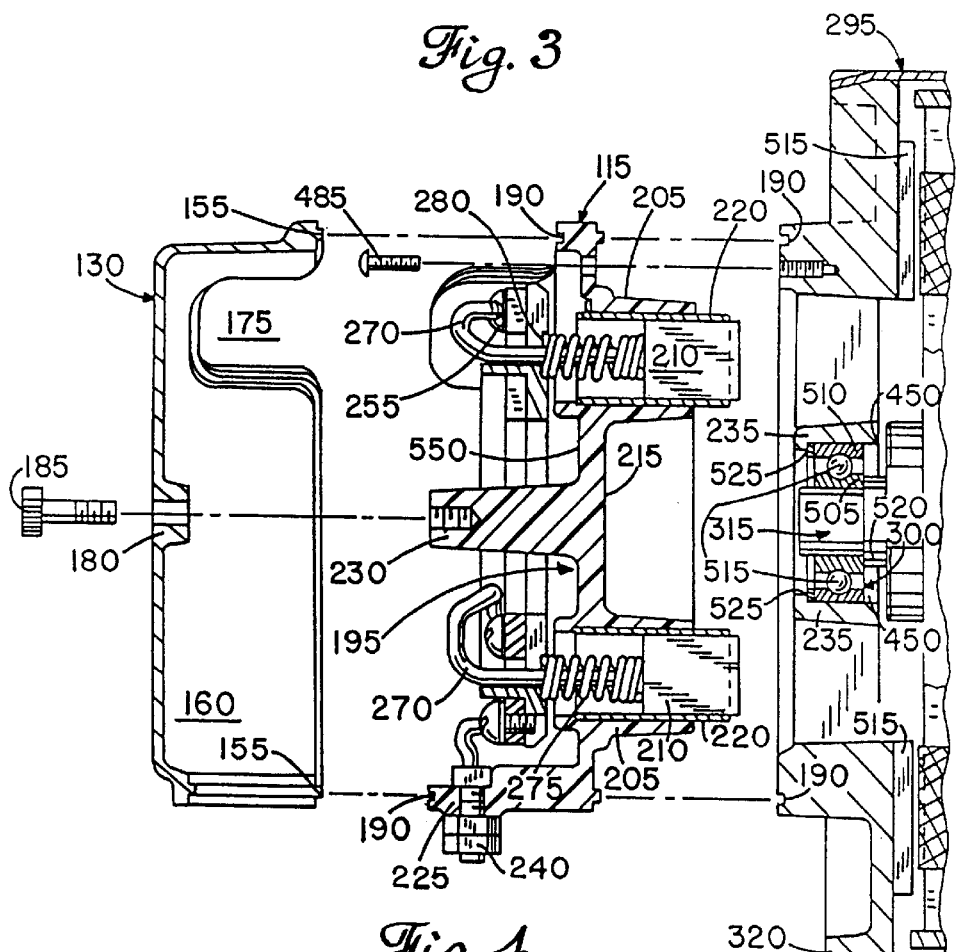
FIG. 4 is a partial-exploded side view of FIG. 1.
Figure 5:
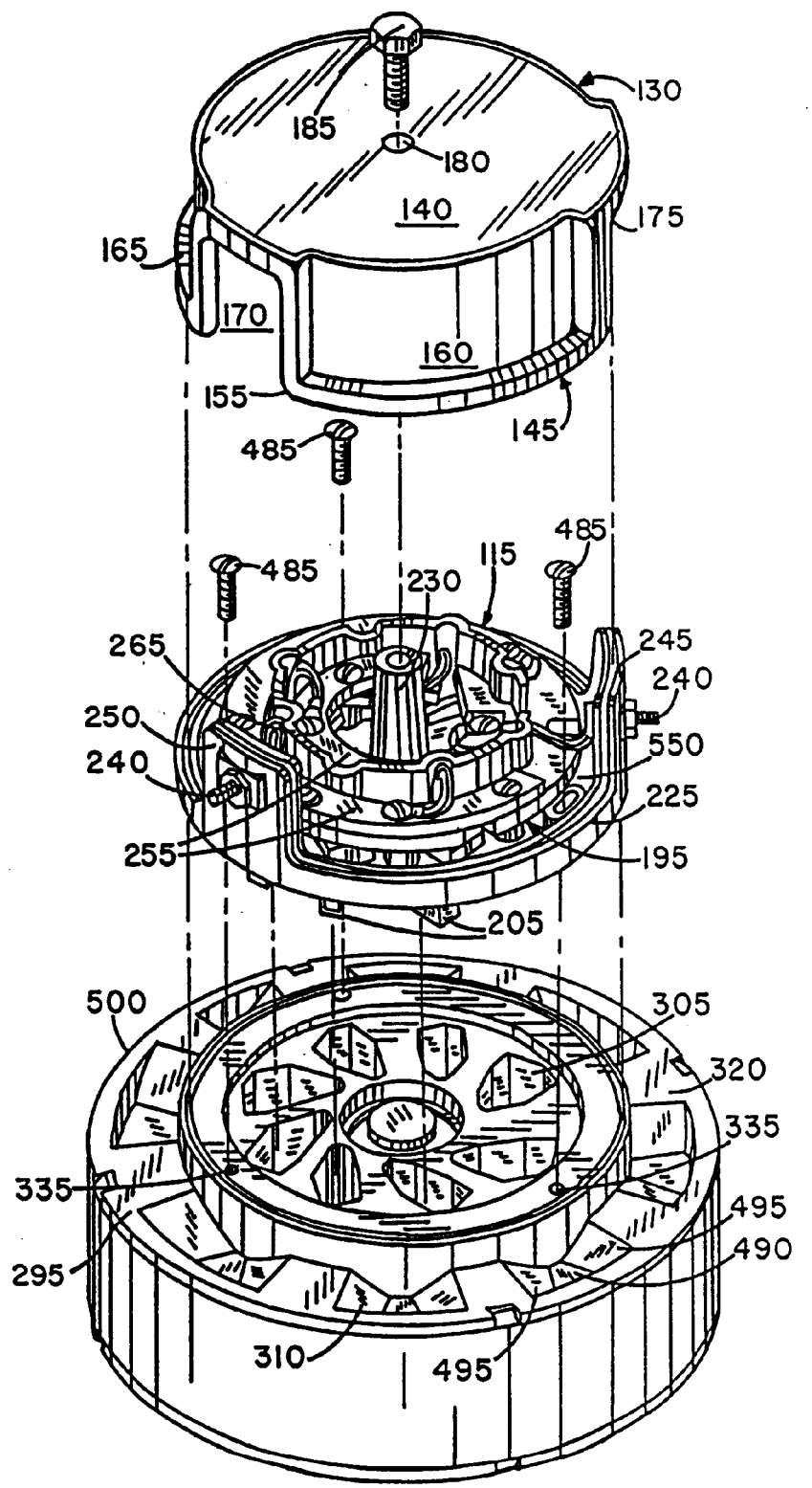
FIG. 5 is a perspective exploded view of FIG. 1.

Referring to the embodiment shown in FIGS. 1, 2, and 5, a motor 100 is illustrated. The motor 100 comprises a housing 105, a brush carrier 115, a rotor 120, a shaft 290, and a stator 125. The housing 105 preferably includes a cover 130 and a main body portion 135. The cover 130 has a base 140 and an open end 145 defined by an annular edge 155. Preferably, the base 140 couples the open end 145 through curved walls 160 and 165. Cutout portions 170 and 175 separate the curved walls 160 and 165 and provide access to an interior area 150. Preferably, a fastener 185 passing through an aperture 180 secures the cover 130 to the brush carrier 115. As shown in FIGS. 2 and 4, the annular edge 155 engages a channel 190 near the outer periphery of the brush carrier 115, creating a substantially watertight seal. The cover 130 is fabricated from cast, stamped, or molded materials and may have a plurality of strengthening ribs (not shown) on either the interior or the exterior surfaces.

Figure 7:
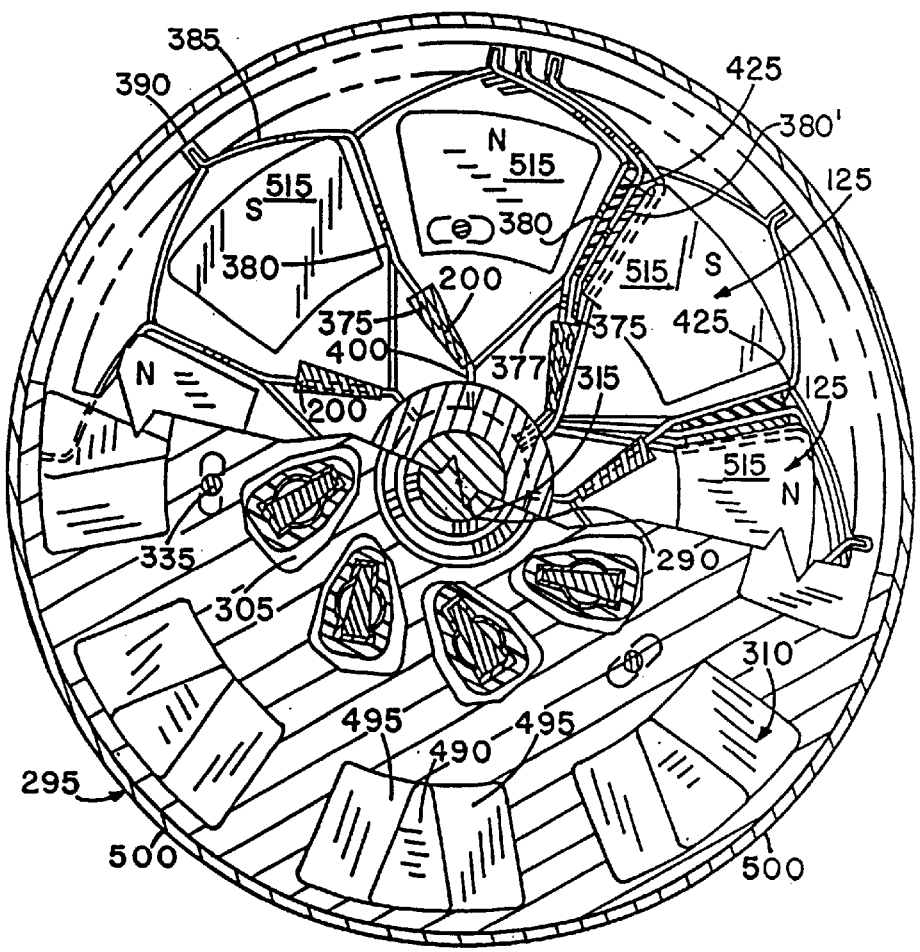
FIG. 7 is cross-sectional view taken along line 7—7 of FIG. 2.

In the motor 100 of FIGS. 2–5, the brush carrier 115 comprises a substantially annular base 195 positioned near a commutator surface 200 (partially illustrated in FIG. 7). The annular base 195 includes a plurality of brush holders 205 that partially surround a plurality of brushes 210. See FIGS. 4 and 5. Preferably, the bush holders 205 are substantially wedge shaped and project from a first carrier surface 215. The brush holders 205 can take many other shapes including polygon and curvilinear shapes, for example.

Preferably, one or more sleeves 220 are disposed between the brushes 210 and the brush holders 205, as shown in FIG. 4. The sleeves 220 pass through and partially project from the brush holders 205. An annular ring 225 and a mounting boss 230 on a second carrier surface 550 interconnect the brush carrier 115 to the cover 130. Preferably, the mounting boss 230 receives the fastener 185, which urges the cover 130 against the brush carrier 115.

A plurality of terminals 240 are mechanically interconnected with a plurality curved sidewalls 245 and 250 integrally molded to the annular ring 225. See FIGS. 3 and 5. Preferably, the sidewalls 245 and 250 are dimensioned to close off the interior area 150 when the cover 130 engages the brush carrier 115, leaving the terminals 240 exposed and accessible from the outside of the motor 100.

Figure 3:
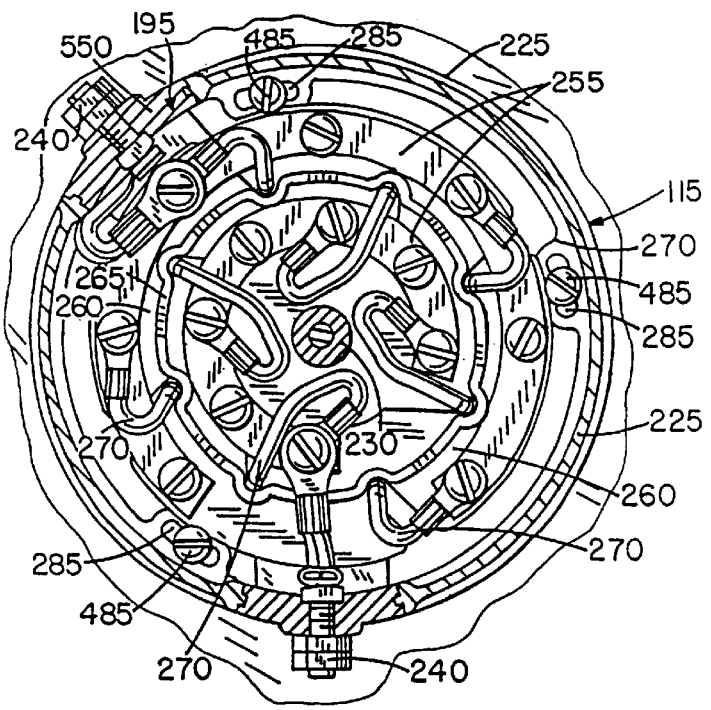
FIG. 3 is a partial cross-sectional view taken along line 3—3 of FIG. 2.

Two bus bars 255 electrically connect the terminals 240 to the brushes 210 as shown in FIG. 3. Preferably, the bus bars 255 each have a generally horseshoe shape, and are concentrically supported by the annular base 195. A bus barrier 260 is disposed between the bus bars 255 and the brush carrier 115. Preferably, the bus barrier 260 has a unitary circumferential rib 265 (best seen in FIG. 5) that mechanically and electrically separates the bus bars 255. To simplify assembly, the brush carrier 115 and/or the bus barrier 260 may be a unitary cast, stamped, or molded structure.

Figure 6:
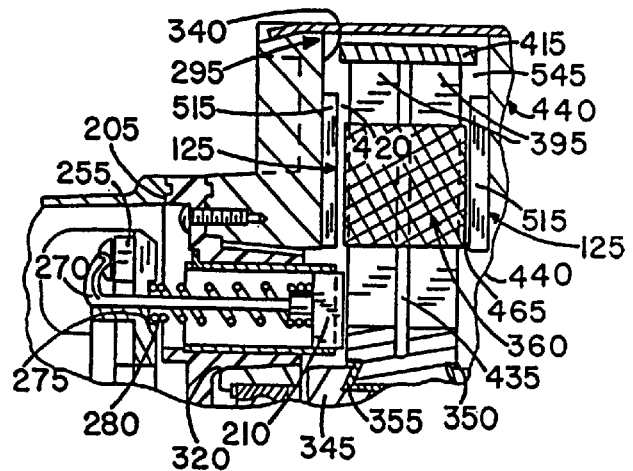
FIG. 6 is a partial-sectional view of FIG. 1.

Referring to FIGS. 4 and 6, a plurality of wires 270 electrically connect bus bars 255 to brushes 210. In the brush holders 205, wires 270 pass through springs 275. The springs 275 are disposed between the brushes 210 and the biasing walls 280 to urge the brushes 210 against the commutator surface 200 (shown in FIG. 7), preferably with a spring force of 6.6 to 9.3 pounds per square inch, with 8 pounds per square inch being preferred. The wires 270 are of a suitable length and gauge to maintain brush-commutator continuity even as the brushes 210 feed into commutator surface 200 through wear.

As shown in FIG. 3, the brush carrier 115 preferably includes a plurality of fastening slots 285 located inward from the annular ring 225. The fastening slots 285 have dimensions that allow adjustments of the brushes 210 in either a clockwise or counterclockwise direction with respect to the shaft 290 (shown in FIG. 2). Preferably, the fastening slots 285 allow for up to five degrees of circumferential adjustments of the brushes 210 with respect to the shaft 290. A plurality of fasteners 485 passing through the fastening slots 285 secures the brush carrier 115 to the first endbell 295 as shown in FIG. 4.

FIGS. 5 and 7 illustrate the first endbell 295 in greater detail. The first endbell 295 has a substantially annular shape having a plurality of polygonal apertures 305. The apertures 305 are equally spaced around and substantially concentric to a conical hub 315 and are larger than the brush holders 205 to allow for adjustment. See FIG. 4. As shown in FIG. 4, the conical hub 315 includes an inner cylindrical wall 450 terminating at an interior annular ridge 235 having an abutting surface 525. The cylindrical wall 450 and the abutting surface 525 form a seat for a bearing 300.

The bearing 300 includes an inner raceway 505, an outer raceway 510, and a plurality of balls or rollers 515 (two of which are shown) that rotate freely therebetween. The inner raceway 505 abuts shaft 290 (shown in FIG. 2) on a bearing-flange 460. The outer raceway 510 is seated against abutting surface or flange 525 and wall 450, preventing axial movement of the bearing 300 in one axial direction. In the opposite axial direction, bearing 300 is held in place by retaining ring 520. The inner raceway 505 receives and supports the shaft 290, facilitating the rotational movement of the shaft 290 with respect to the first endbell 295. The integration of the bearing 300 with the first endbell 295 allow the brush carrier 115 to be mechanically disconnected from the motor 100 without disturbing the bearing 300 because neither the inner nor outer raceways 505 and 510 is interconnected to the brush carrier 115, but instead are captured by a bearing retainer 520, and a flange 525 along wall 450 which is interconnected to the first endbell 295. See FIG. 4.

FIGS. 5 and 7 also illustrate reduction areas 310. The reduction areas 310 have recessed triangular areas 490 between two sloped semi-rectangular areas 495. The reduction areas 310, which can take many other shapes, preferably are spaced around and within the first endbell perimeter 500. The reduction areas 310 decrease motor 100 weight and increase first endbell 295 surface area, both of which promote motor 100 cooling.

The first endbell 295 also includes a plurality of fastening bores 335 located between the polygonal apertures 305 and the reduction areas 310. The fastening bores 335 provide means in which the brush carrier 115 is urged against the first endbell 295. Preferably, fasteners 485 secure the engagement.

Returning to FIGS. 6 and 7, the first endbell 295 also includes a portion of the stator 125. The stator 125 includes a plurality of permanent magnets 515 equally spaced around and substantially concentric to the conical hub 315 (shown in FIG. 4). The magnets 515 are evenly arranged by alternating polarity on a second endbell surface 440. Preferably, the magnets 515 are positioned within the endbell perimeter 500 and in axial alignment with a portion of the windings 360. As shown in FIG. 6, the magnets 515 are separated from the windings 360 by axial air gaps 420, which are between 0.040 to 0.090 inches in axial length, with 0.070 inches being preferred.

The particular material used to construct the magnets will depend on the operating conditions and application of the motor 100. While almost any magnetic material can be used, magnets made from ceramic-iron composites are very effective, with neodymium iron boron magnets being preferred.

FIG. 2 illustrates the rotor 120. The rotor 120 preferably comprises a disk-type armature 395 interconnected to the shaft 290. Insulating layer 345 passes between the armature 395 and the shaft 290 between a pair of spaced bearings 300 and 330. A bridge 350 receives the insulating layer 345 in a dovetail-type key engagement 355 electrically isolating and mechanically coupling the armature 395 to the shaft 290.

The armature 395 also includes a plurality of electrically conductive windings 360 firmly fastened to the insulating layer 345 such that when the rotor 120 rotates, the plurality of windings 360 are rotated about an axis 430. See FIG. 2. It is preferable, but not essential, that the windings 360 have an air core 435. Alternatively, the core 435 may be formed from laminated disks or other of suitable materials.

Figure 8:
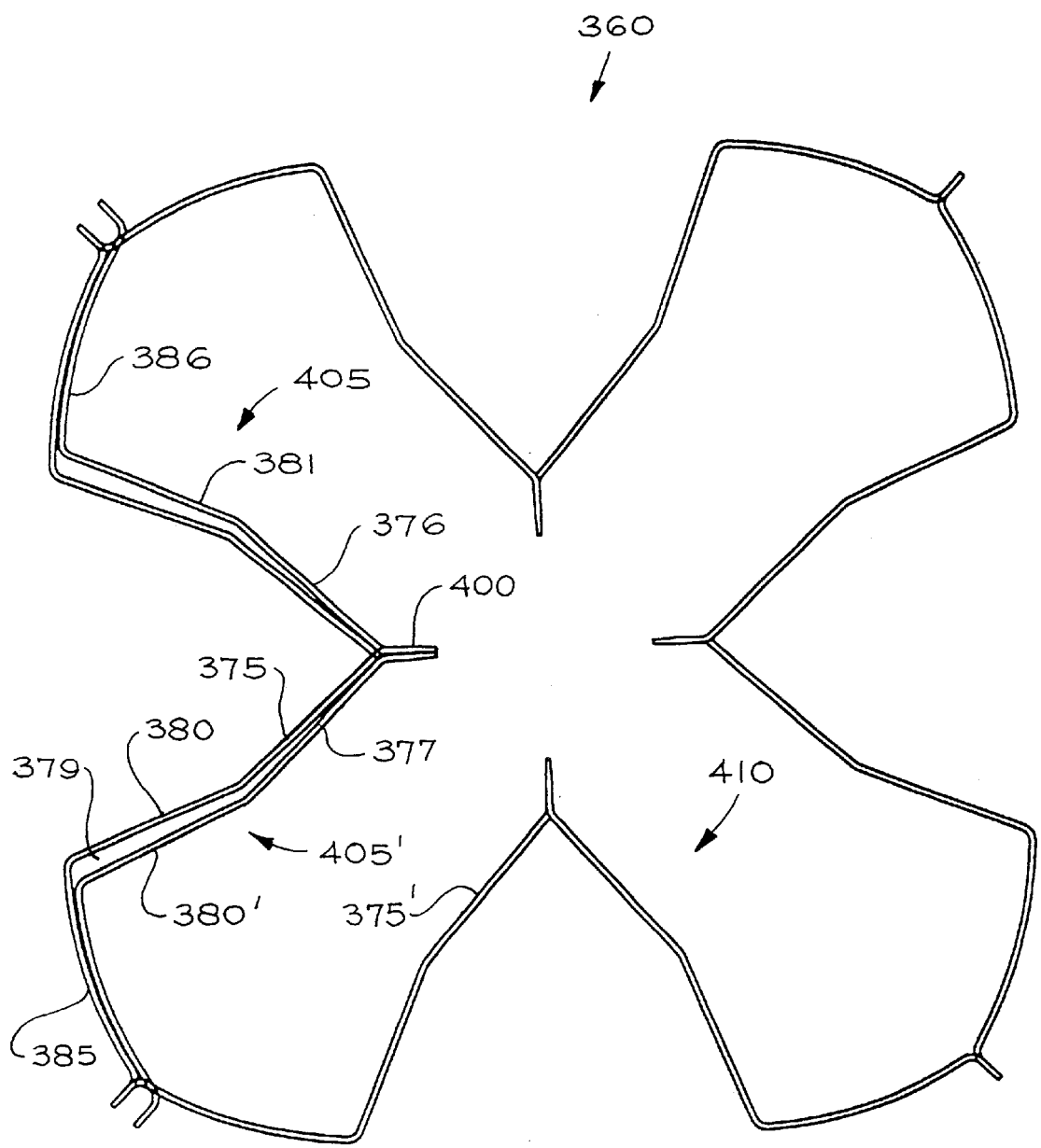
FIG. 8 is a schematic view of the windings of FIG. 2.

The windings 360 depicted in FIG. 8 are wave wound windings distributed along the radius of the armature 395. A first winding 405 includes a bridge portion 400, upper and lower commutating portions 375 and 376, two main portions 380 and 381, and two outer portions 385 and 386. A second winding 410 is substantially similar to the first winding 405 and interconnects to the first winding 405 at the outer portion 385. In a similar fashion, additional windings interconnect to adjacent windings near the outer periphery of the armature 395.

As shown, the commutator surface 200 of FIG. 7 are formed by one of the two commutating portions 375 and 376 from each winding 360. The commutating portion 375 and 377 of the first and the fifth winding 405 and 405' of FIG. 8, for example, are positioned adjacent to one another to form part of the commutating surface 200. See FIG. 7. Although only partially shown, the commutating portions 375 and 377 are insulated by radial extending air gaps 379. Persons of ordinary skill in the art will appreciate that the commutating portions, such as 375 and 377, for example, can assume many shapes besides the wedge shapes shown in FIG. 7. Other commutator configurations are well known to those skilled in the art and are envisioned in alternate embodiments. See for example, PCT Application WO 95/17779 published Jun. 29, 1995 to London Innovation Limited for additional commutator examples, which is hereby incorporated by reference herein.

The windings 360 depicted in FIG. 7 are stamped and encircle the shaft 290. Each winding is connected to another winding by an oversized clip 415 or other connector, such as a solder or a weld joint, for example, at an outer periphery of the armature 395 as shown in FIG. 6. The clips 415 increase windage and rotor surface area which cools the motor 100. Additional details regarding the rotor 120 configuration are disclosed in U.S. Pat. No. 4,823,039 entitled "Electrical Machines," which is hereby incorporated by reference herein.

As further shown in FIG. 7, steel inserts 425 are disposed between the main portions 380 and 380' of the windings 360 to increase magnetic flux.

FIGS. 2 and 6 partially illustrates the second endbell 440. The second endbell 440 has a substantially annular shape having a cylindrical hub 445 near its center. Like the first endbell 295, the cylindrical hub 445 includes a cylindrical wall 455 terminating at an interior annular ridge 535. A bearing 330 seats against the cylindrical wall 455 and an abutting surface 540 of the annular ridge 535 to prevent axial movement of the bearing 330 in one axial direction. The bearing 330 is retained from moving in an opposite axial direction by a snap ring 456. The bearing 330 abuts shaft 290 (shown in FIG. 2) on bearing-flange 530. It should be understood that the bearing 330 is positioned and configured in a similar manner as bearing 300 that was previously described, and therefore, is not described in further detail.

As shown in FIG. 2, bearings 300 and 330 are distributed on opposite sides of the rotor 120. Other embodiments may employ bearings or bearing halves in either the first or second endbells 295 and 440 alone. Like the first endbell 295, the cylindrical wall 455 of the second endbell 440 may define the outer bearing raceway 510. A groove (not shown) formed in the cylindrical wall 455 may act as the outer raceway 510 supporting the bearing balls or rollers 515, and thus, eliminate the need for a separate outer bearing raceway.

FIGS. 2 and 6 further illustrate other portions of the stator 125. The stator includes a plurality of permanent magnets 515 equally spaced about and substantially concentric with cylindrical hub 445 of the second endbell 440. The magnets 515 are evenly arranged by alternating polarity on the interior surface 465 of the second endbell 440. Preferably, the magnets 515 are positioned within the second endbell perimeter 545.

The assembled motor 100 is illustrated in FIG. 2. The shaft 290 is mounted between the bearing pairs 300 and 330 recessed in the first and second endbells 295 and 440. The insulating layer 345 passing between the armature 395 and the shaft 290 is connected to the shaft 290 by a fastening ring 470. Means 115 for retaining one brush interconnect the brushes 210 with the first endbell 295. The polygonal apertures 305 of the first endbell 295 are dimensioned to allow up to five degrees of circumferential adjustment of the brushes 210 with respect to the first endbell 295. A plurality of securing tabs 475 enclose a rotor cavity 480 and secure the spaced apart relationship of the first and second endbells 295 and 440.

II. Other Arrangements

Figure 9:
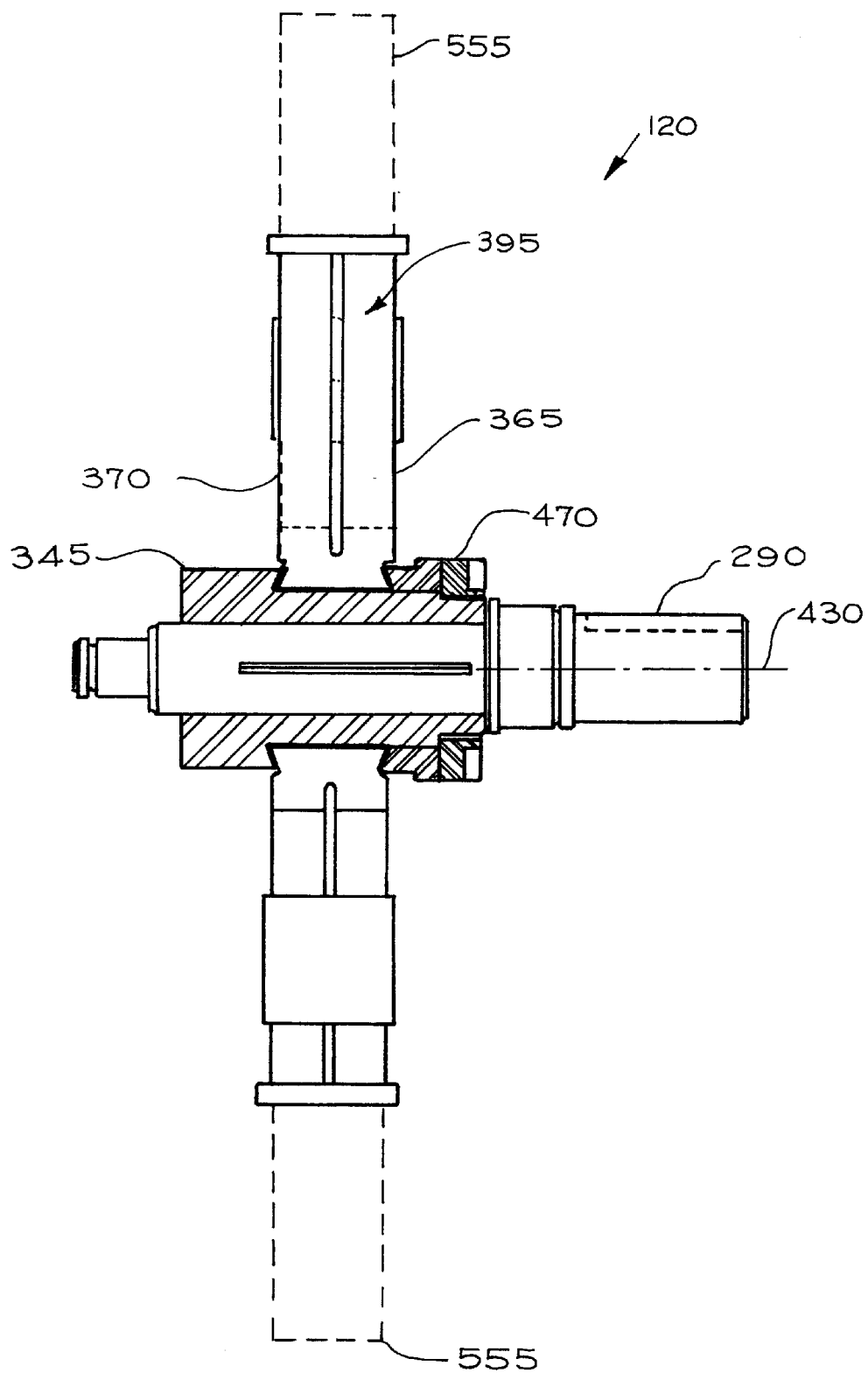
FIG. 9 is a partial sectional view of an alternate rotor that may be used with the invention.

FIG. 9 partially illustrates an alternate armature arrangement. As shown, armature 395 is formed along a plane 555 transverse to axis 430. The armature 395 includes first and second surfaces 365 and 370 machined or lathed as commutating surfaces. It is preferable, but not essential, that a non-symmetrical press out shaft be used as shown in FIG. 9, or that the insulating layer 345 and the shaft 290, respectively, have a substantially symmetric shape relative to plane 555.

When an insulating layer and a shaft have a substantially symmetric shape relative to a plane, the length of the insulating layer and the fastening ring can be almost evenly distributed on either side of the armature. This symmetry allows either commutating portion 375 or 376 of FIG. 8 to be positioned adjacent to the brushes 210 without removing the armature 395 from the insulating layer 345.

When a press out shaft is used as shown in FIG. 9, the armature 395 may be removed from shaft 290 and turned over. When the first and second surfaces 365 and 370 of the armature 395 have interchanged positions, the armature 395 can be pressed onto shaft 290. This process allows either commutating portion 375 or 376 of FIG. 8 to be interchangeably aligned with the brushes 210. In the embodiment of FIG. 9, the useful life of the rotor 120 can double.

Figure 10:
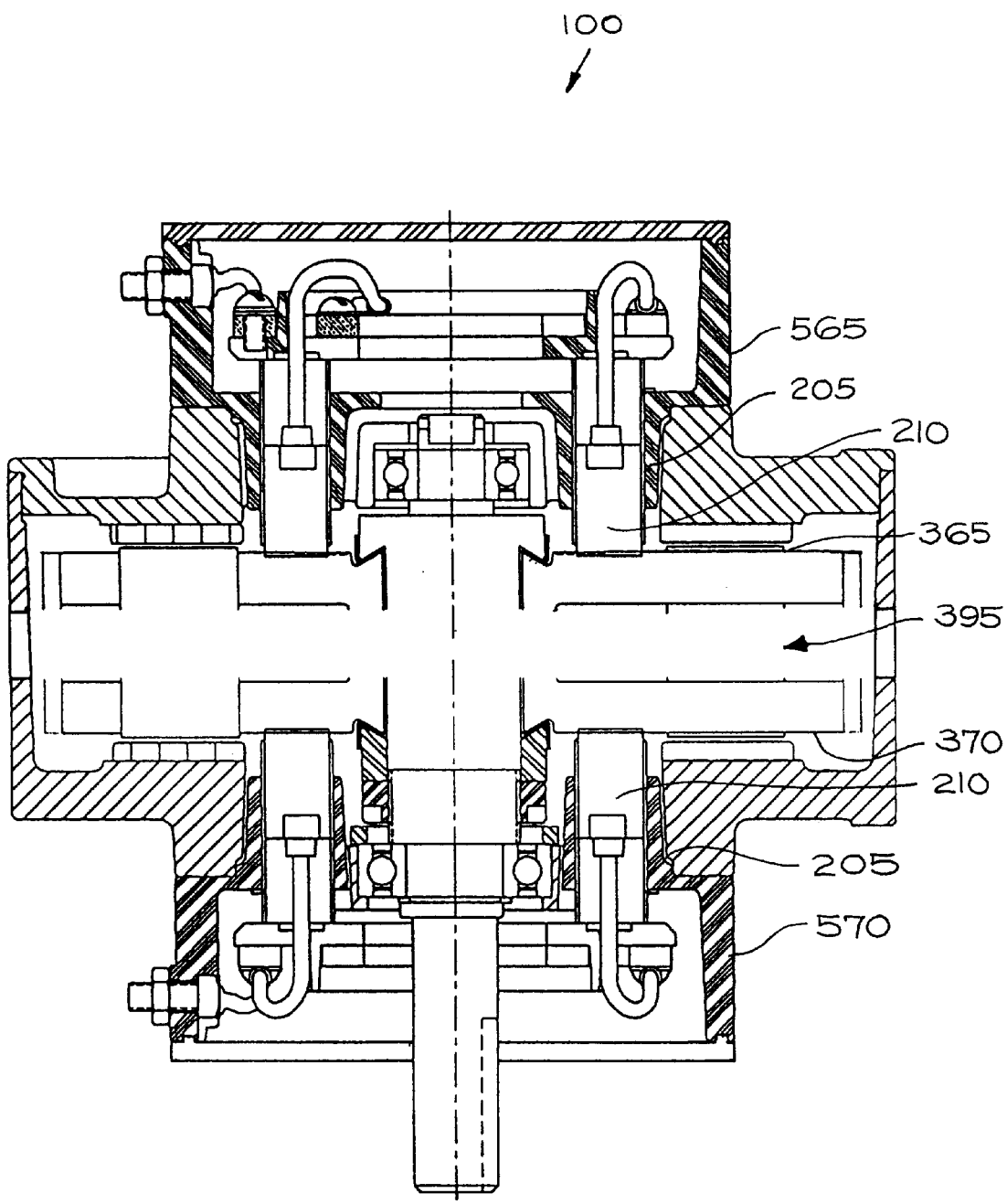
FIG. 10 is a perspective view of a second embodiment of the invention.

FIG. 10 illustrates a perspective view of a second embodiment. This embodiment provides two brush carriers 565 and 570 that align each set of brush holders 205 with respective upper and lower commutating portions 375 and 376 of the windings 360 of FIG. 8. In FIG. 10, a first brush carrier 565 is positioned adjacent to the first surface 365 of the armature 395 and a second brush carrier 570 is positioned adjacent to the second surface 370 of the armature 395.

Figure 11:
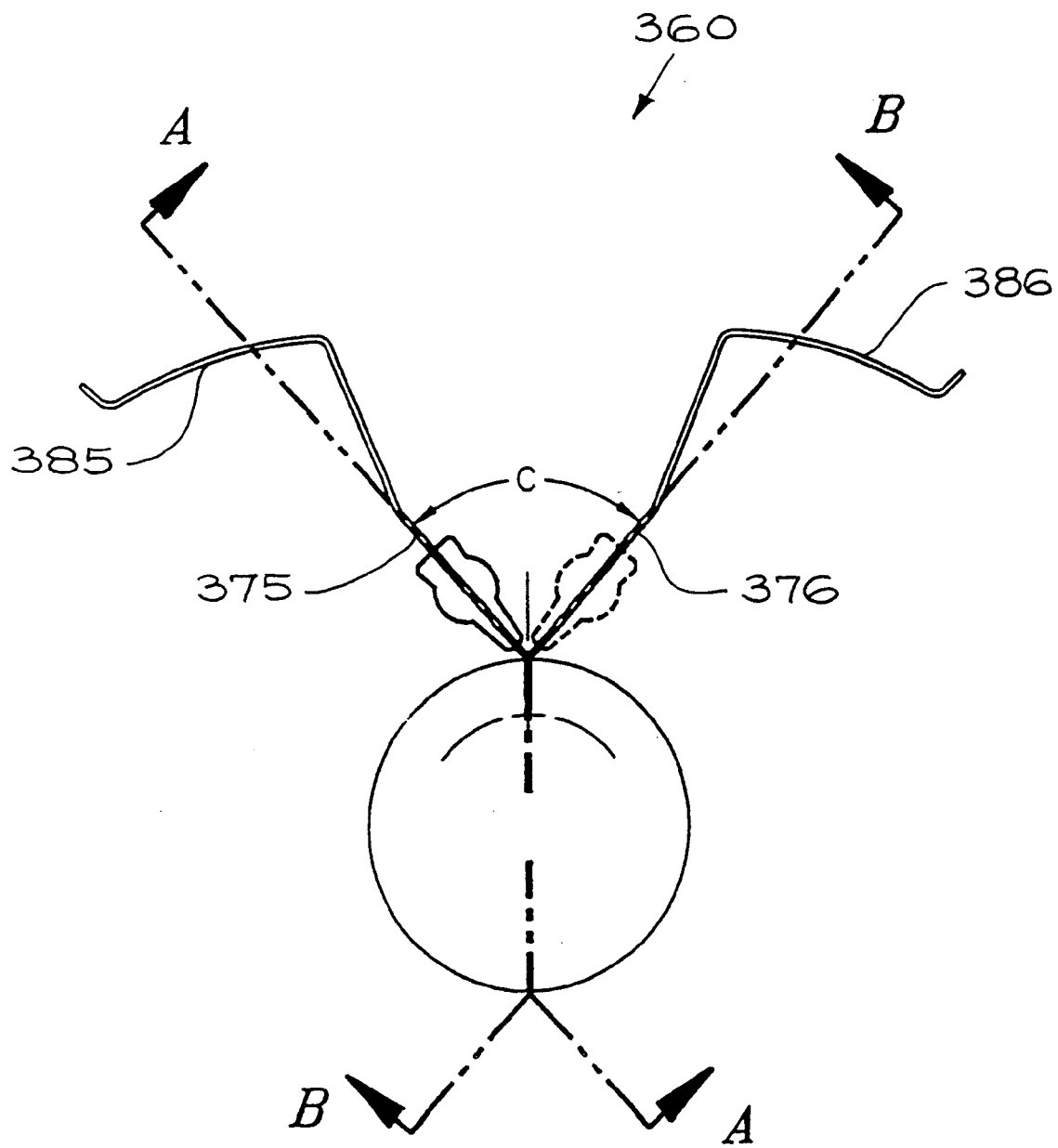
FIG. 11 is a schematic view of the windings of FIG. 10.
Figure 12:
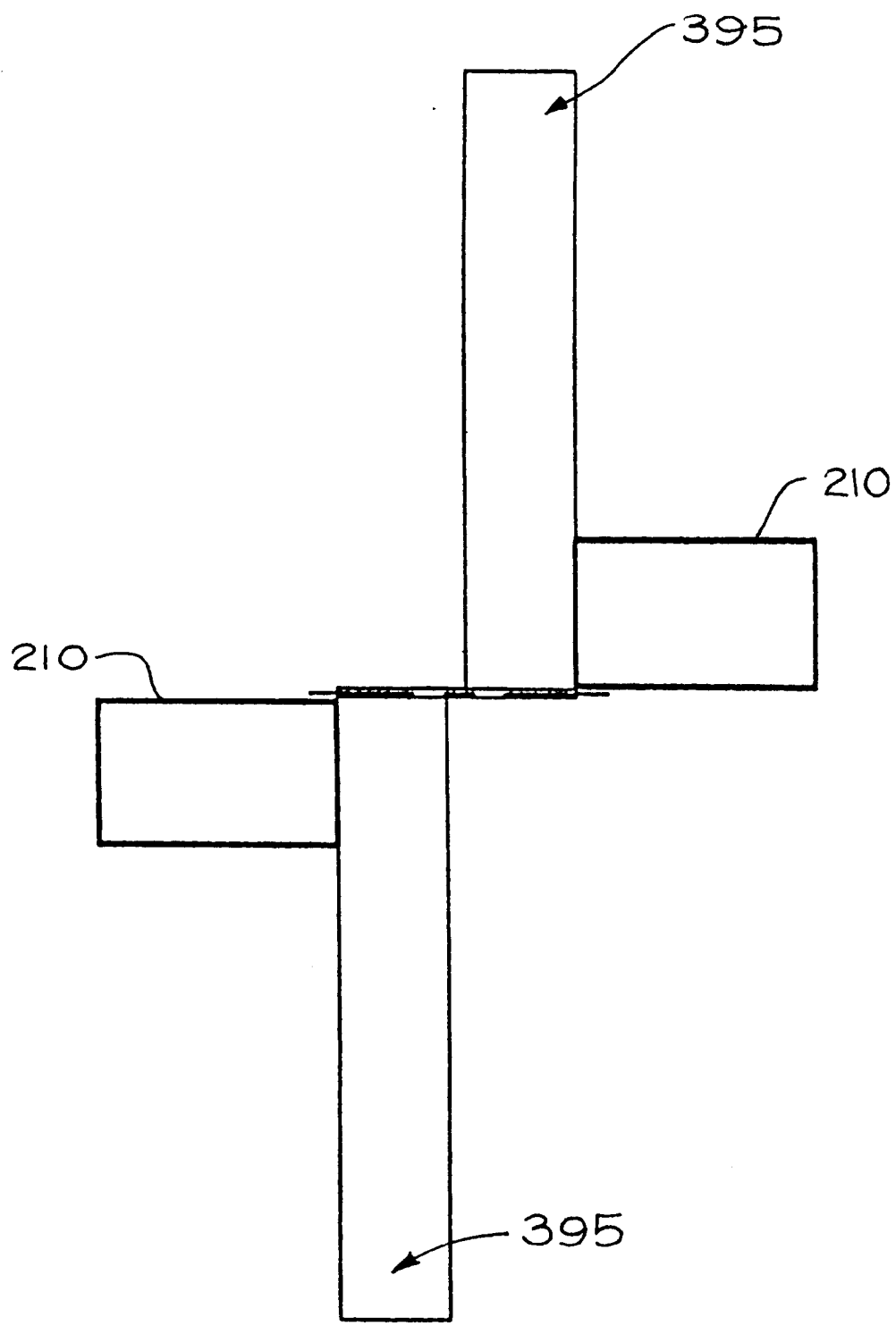
FIG. 12 is a partial-sectional view of the windings and brushes of FIG. 10.

The brush carriers 565 and 570 are rotated in either a clockwise or counterclockwise direction to align the brushes 210 with the respective commutating portions 375 and 376 of FIG. 8. In this case, the angular rotation between the first and the second brush carriers 565 and 570 is approximately equal to the bend angle 'C' of the windings 360 illustrated in FIG. 11. As shown in FIG. 11, the bend angle 'C' separates the upper from the lower commutating portions 375 and 376 anywhere from about seventy to ninety degrees, with a preferred separation of approximately eighty-three degrees. When the first and the second brush carriers 565 and 570 are in alignment, two sets of brushes 210 are preferably not aligned in the same plane with one another, as shown in FIG. 12.

Under normal operation, the addition of a second brush carrier 570 can double the brush surface area engaging the commutating portions 375 and 376 and reduce heat losses. Of course, the additional brush carrier 570 increases the number of brushes 210 engaging the armature 395, which reduces the amount of power flowing through individual brushes 210. When the number of brushes 210 engaging the armature 395 is doubled, the amount of power flowing through individual brushes 210 should be reduced by approximately fifty percent. This feature is expected to enable the motor 100 to handle higher currents before the heating of the brushes 210 becomes a problem.

Figure 13:
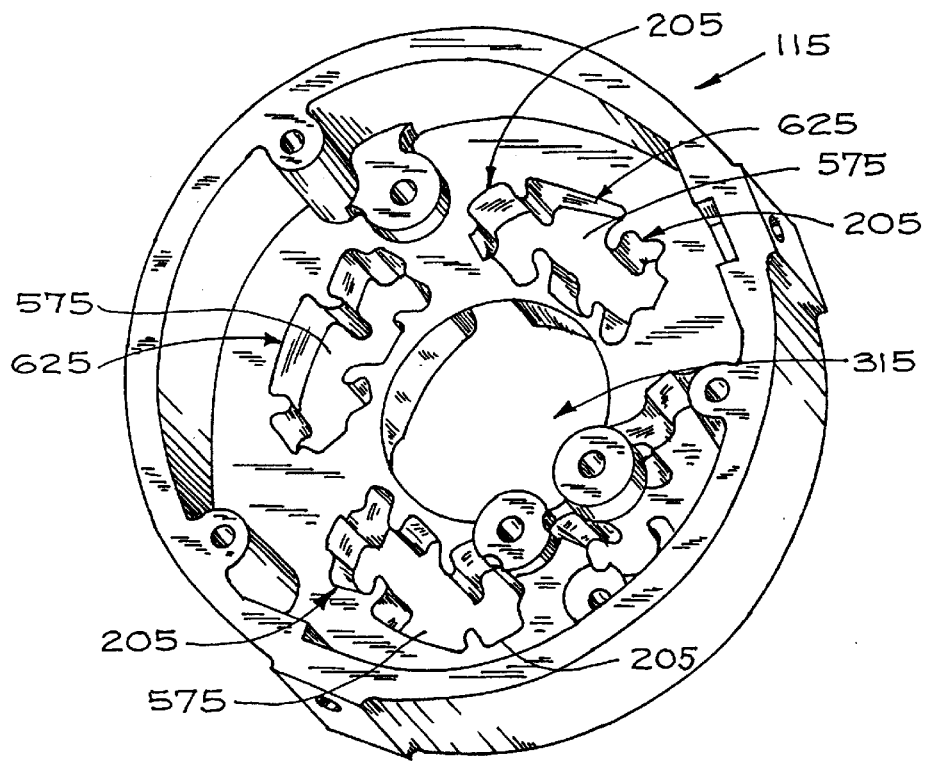
FIG. 13 is a rear perspective view of an alternate brush carrier.
Figure 14:
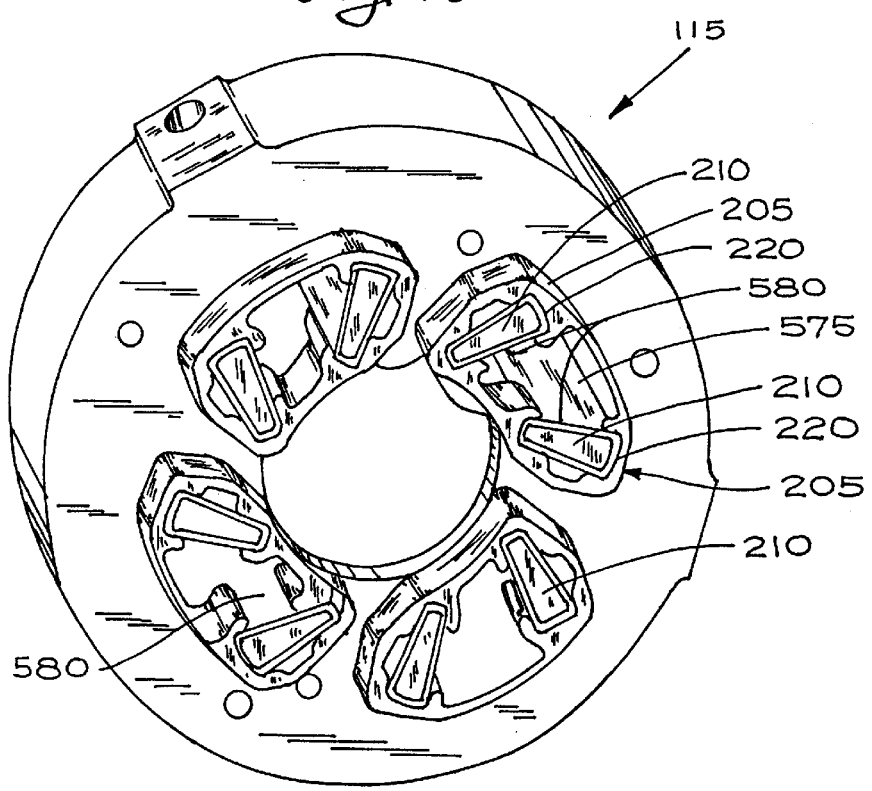
FIG. 14 is a front perspective view of the brush carrier of FIG. 13.
Figure 15:
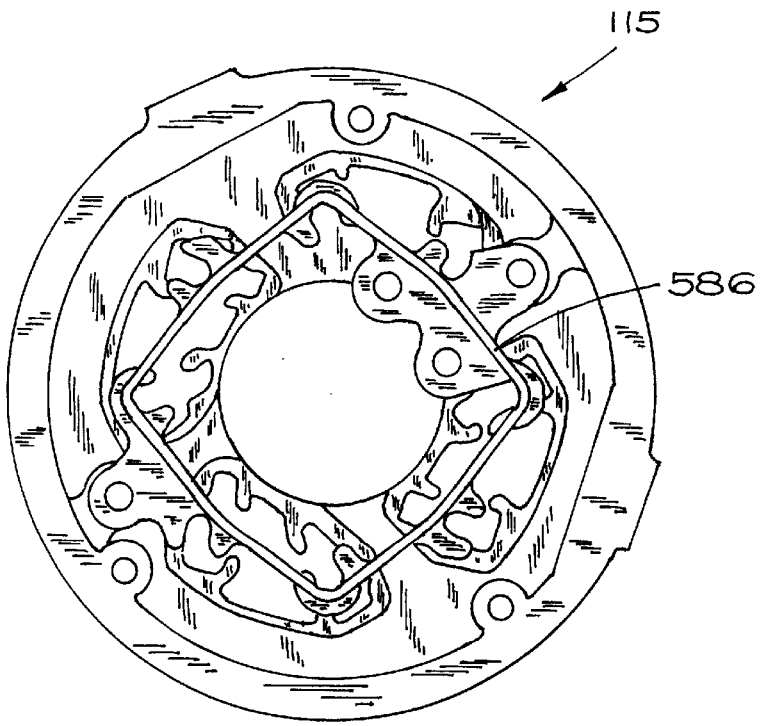
FIG. 15 is rear view of a brush retainer and the brush carrier of FIG. 13.

FIGS. 13–15 illustrate other aspects of the invention. As shown in FIGS. 13–15, the polygonal shapes of the brush holders 205 are partially separated by air channels 575 formed in the brush carrier 115 to provide axial cooling to the motor 100. The air received by the air channels 575 is directed across at least one of the first or second surfaces 365 and 370 of the armature 395 shown in FIG. 9.

As shown in FIG. 14, one or more sleeves 220 are preferably disposed along the inner periphery of the brush holders 205 such that a portion of each sleeve 220 closes off air access passages 580 that are in fluid flow communication with the air channels 575. The sleeves 220 absorb and dissipate heat radiated from the brushes 210, transferring the heat to the air that fills the air access passages 580 and air channels 575 like a heat sink.

Referring to FIGS. 14 and 15, a brush retainer bracket 586 having a biasing surface (not shown) is provided to cooperate with the springs 275 (not shown), so that the springs 275 urge the brushes 210 against the commutator surface 200 (not shown). In this configuration, the brushes 210 are resiliently biased and can be easily removed and inspected. Of course, the air channels 575 and access passages 580 may be employed with any of the versions described herein.

Figure 16:
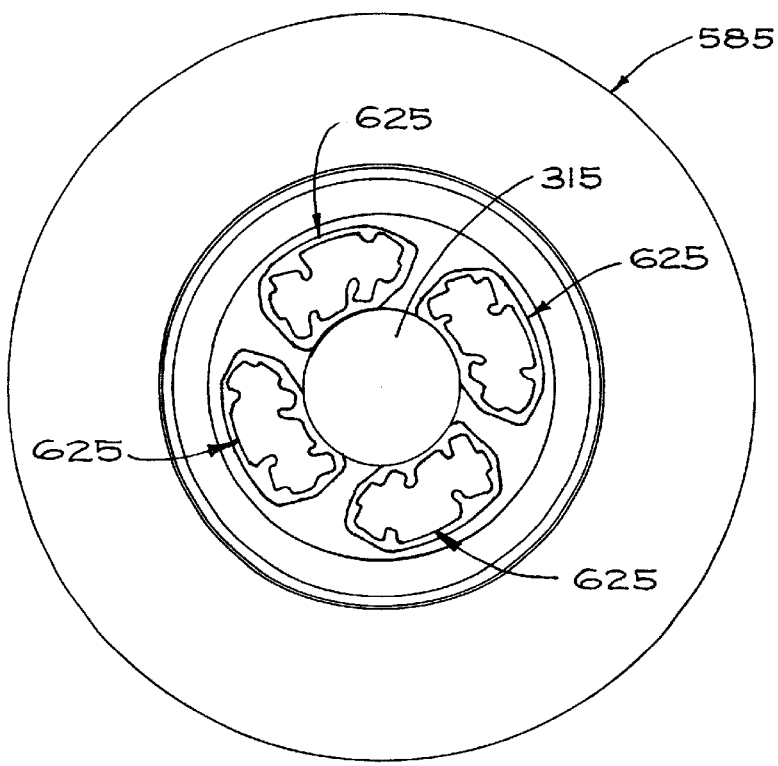
FIG. 16 is a front view of an endbell that receives the brush carrier of FIG. 13.

As shown in FIG. 16, an endbell 585 includes four polygonal apertures 625 equally spaced around and equidistant from the conical hub 315. The apertures 625 are shaped and dimensioned to receive the polygonal shapes of the brush holders 205 and air channels 575 shown in FIG. 14. Like the endbells previously described, the endbell 585 shown in FIG. 16 may include integrated bearing retainers that allow either of the brush carriers 565 and 570 of FIG. 10 to be mechanically disconnected from the motor 100 without disturbing the bearings or other motor 100 parts. Because the endbell 585 is otherwise substantially similar to the endbells previously described, other features and advantages of the endbell 585 will not be repeated.

Figure 17:
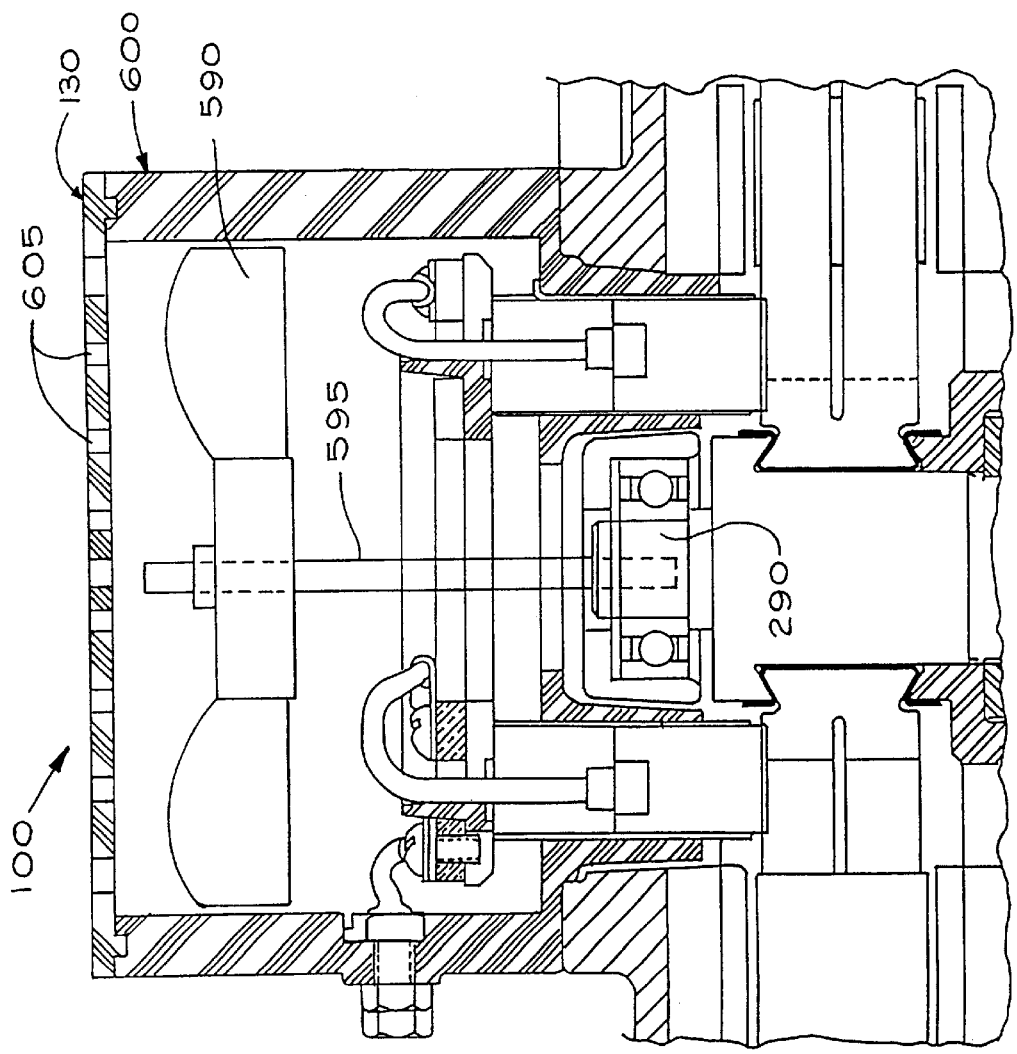
FIG. 17 is a cross sectional side view of the brush carrier including an optional fan.
Figure 18:
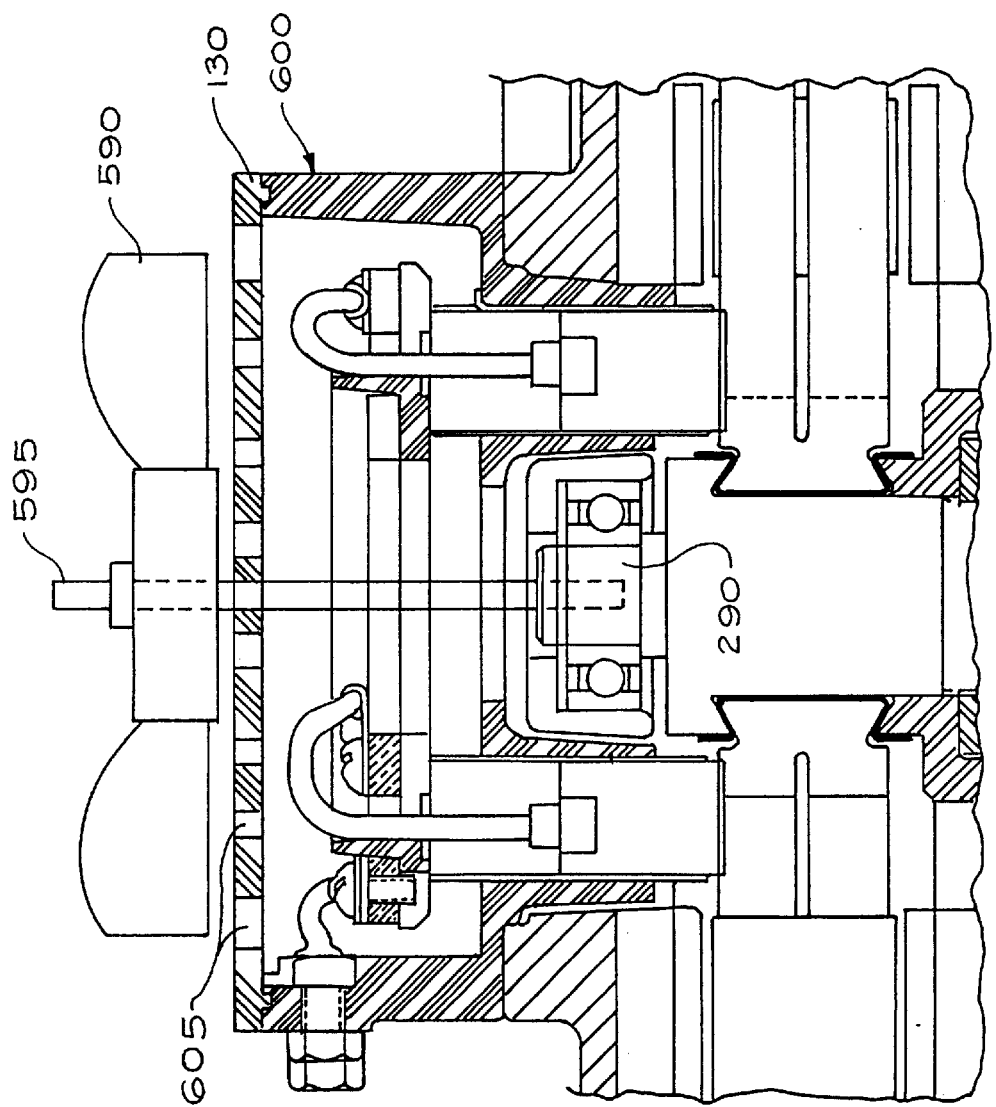
FIG. 18 is a cross sectional side view of the brush carrier with an alternate, optional fan.

FIGS. 17 and 18 illustrate fans that may be used with the invention of FIGS. 13–15. As best shown in FIG. 17, a fan 590 is press fit onto a second shaft 595 that is coupled to the motor shaft 290. The rotation of the motor shaft 290 causes the fan 590 to rotate at the same speed and direction as the motor shaft 290. In this configuration, air is channeled through apertures 605 in the cover 130, and air flows through the air channels shown in FIG. 14 to provide additional airflow through the motor 100.

Figure 19:
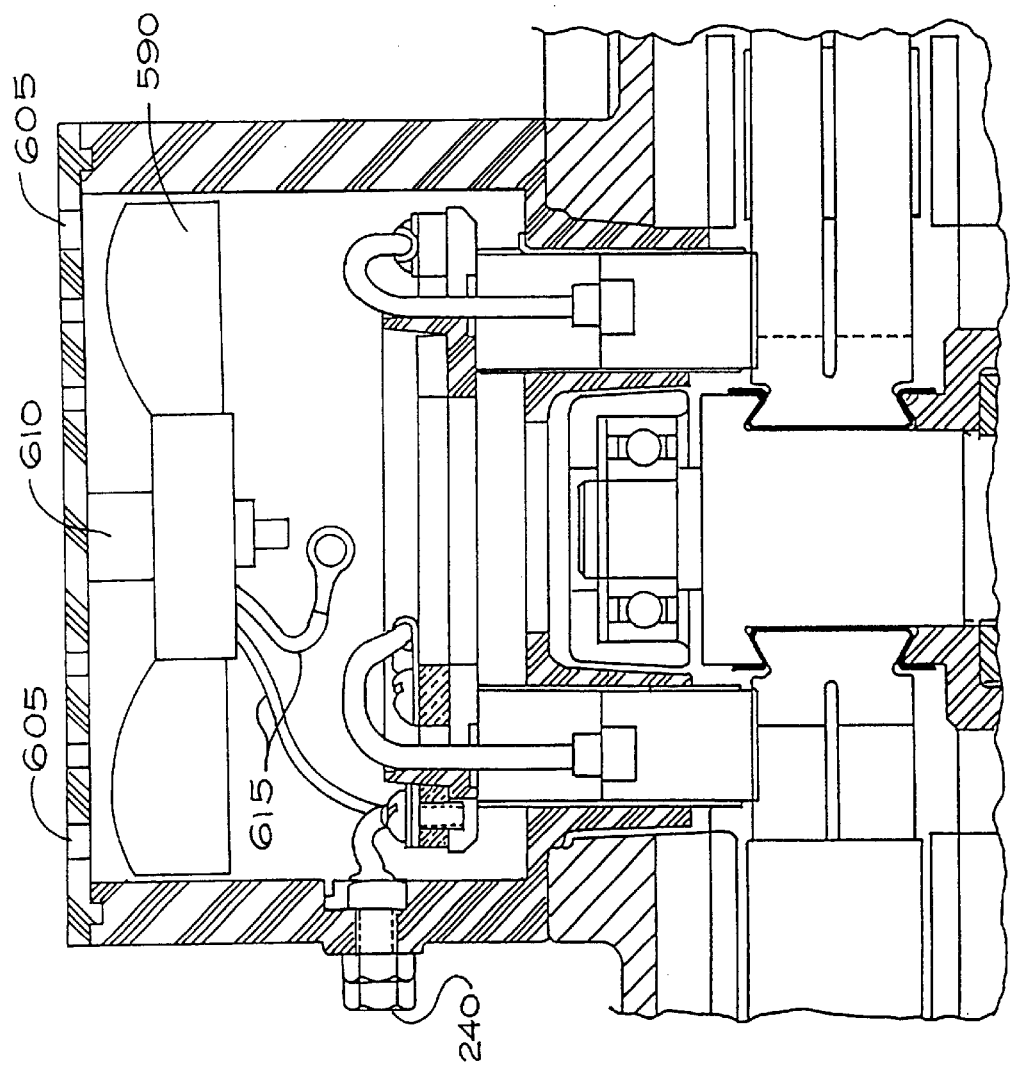
FIG. 19 is a cross sectional side view of the brush carrier with yet another optional alternate fan.

As shown in FIGS. 17 and 18, the fan 590 may or may not be enclosed within a housing or a shroud 600. If an enclosure is desired, the housing or shroud's interior surfaces may be shaped, such as in the form of two opposed funnels that taper inwardly to a common area from inlet and outlet ends, to facilitate air suction and exhaust. Moreover, the fan 590 need not be coupled to the motor shaft 290 as shown in FIG. 19. Rather, the fan 590 can be powered by a fan motor 610 that draws electrical power from the terminals 240 (only one is shown) through leads 615. Advantageously, any one of the fans described above are expected to cool the motor 100 by about ten degrees Celsius.

It is clear that many other alternative embodiments of the invention are also possible. For example, the windings of the rotor 120 may be interchanged with the stator magnets 515 disposed on one of the endbells. Of course, the portion of magnets 515 on the other endbell would then be removed. Furthermore, the first endbell 295 can be formed without the reduction areas 310 just as the second endbell 440 may be formed with reduction areas 310. In another alternative, stator windings could replace the stator magnets 515 or the brush carrier can be positioned on an opposite side of the armature 395.

II. Motor Inspection

To inspect the motor 100, the brush carrier 115 can be separated from the first endbell 295 without disturbing the bearings 300 and 330. The brush carrier 115 is separated from the first endbell 295 by first removing the fastener 185 from the mounting boss 230. The cover 130 may then be removed from the brush carrier 115. The removal of fasteners 485 from the first endbell 295 allows the brush carrier 115 to be urged away from a first endbell surface 320 without disturbing the bearings 300 and 330. Each brush 210 can then be examined. In addition, the removal of the brushes 210 allows for inspection of the commuting surface 200 without any further disassembly. The commutating surface 200 can be viewed through any one or more of the polygonal apertures 305 of the first endbell 295.

In the embodiments employing multiple brush carriers, the additional brush carrier may be separated from each endbell in substantially the same manner as the first brush carrier without disturbing bearings or other motor parts. The removal of the brush carriers allow for the inspection of the brushes and commutating surfaces.

The foregoing detailed description describes only a few of the many forms that the present invention can take, and should therefore be taken as illustrative rather than limiting.

It is only the following claims, including all equivalents that are intended to define the scope of the invention.

What is claimed is:

1. A motor apparatus, comprising:
   a shaft;
   at least two bearings adjacent to said shaft;
   a rotor, having a first end surface and a second end surface, interconnected to said shaft;
   a stator disposed to magnetically interact with said rotor, and at least one of said rotor and said stator including at least one winding; and
   a brush carrier releasably interconnected with at least one of said rotor and said stator such that disconnecting said brush carrier from at least one of said rotor and said stator leaves said bearings undisturbed, and said brush carrier having at least one air channel positioned so that airflow through said air channel is directed across at least one of said first and said second end surfaces.

2. The motor apparatus of claim 1 wherein said brush carrier further comprises at least one brush holder adjacent to said air channel.

3. The motor apparatus of claim 2 wherein said brush holder has an air access passage in fluid flow communication with said air channel.

4. The motor apparatus of claim 3 further comprising a sleeve at least partially surrounded by said brush holder, said sleeve at least partially surrounding one brush to absorb and dissipate heat radiated from said brush through said air access passage.

5. The motor apparatus of claim 1 further comprising a fan interconnected with said shaft such that the rotation of said shaft causes said fan to rotate.

6. The motor apparatus of claim 5 wherein said fan is enclosed by a housing.

7. The motor apparatus of claim 1 further comprising an electric fan positioned to move air through said air channel.

8. A motor apparatus, comprising:
   a shaft;
   at least one bearing adjacent said shaft;
   a rotor interconnected to said shaft, said rotor including at least one first conductive portion formed on a first end surface of said rotor and at least one second conductive portion formed on an opposite second end surface of said rotor;
   a stator disposed to magnetically interact with said rotor, and at least one of said rotor and said stator including at least one winding; and
   a brush carrier releasably interconnected with at least one of said rotor and said stator such that disconnecting said brush carrier from at least one of said rotor and said stator leaves said bearing undisturbed, said first and said opposite second end surfaces being alternately positionable adjacent to said brush carrier, and said brush carrier having at least one air channel positioned to direct airflow across at least one of said first and said second opposite end surfaces.

9. The motor apparatus of claim 8 wherein said brush carrier further comprises at least one brush holder adjacent to said at least one air channel.

10. The motor apparatus of claim 9 wherein said at least one brush holder comprises two brush holders, wherein said at least one air channel comprises a plurality of air channels, and wherein each of said two brush holders has an air access passage in fluid flow communication with an air channel.

11. The motor apparatus of claim 10 further comprising a sleeve at least partially surrounded by said brush holder, said sleeve at least partially surrounding a brush to absorb and dissipate heat radiated from said brush through said air access passage.

12. The motor apparatus of claim 8 further comprising a fan interconnected with said shaft such that the rotation of said shaft causes said fan to rotate.

13. The motor apparatus of claim 8 further comprising an electric fan positioned to move air through said at least one air channel.

14. A motor apparatus, comprising:
   a shaft;
   at least one bearing adjacent said shaft;
   a rotor interconnected to said shaft, said rotor including at least one first conductive portion formed on a first end surface of said rotor, and at least one second conductive portion formed on a second end surface of said rotor;
   a stator disposed to magnetically interact with said rotor, and at least one of said rotor and said stator including at least one winding; and
   a first brush carrier releasably interconnected with at least one of said rotor and said stator such that disconnecting said first brush carrier from at least one of said rotor and said stator leaves said bearing undisturbed, said first brush carrier being alternately positioned adjacent to one of said first and said second end surfaces; and
   a second brush carrier positioned adjacent to the other one of said first and said second end surfaces, and wherein at least one of said brush carriers further comprises at least one brush holder adjacent to an air channel.

15. The motor apparatus of claim 14 wherein said brush holder has an air access passage in fluid flow communication with said air channel.

16. The motor apparatus of claim 15 further comprising a sleeve at least partially surrounded by said brush holder, said sleeve at least partially surrounding a brush to absorb and dissipate heat radiated from said brush through said air access passage.

17. The motor apparatus of claim 14 further comprising a fan interconnected with said first shaft.

18. The motor apparatus of claim 17 wherein said fan is enclosed by a housing.

19. The motor apparatus of claim 14 further comprising an electric fan positioned to move air through said air channel.

20. A motor apparatus, comprising:
   a shaft;
   a rotor interconnected to said shaft having radially extending conductive windings, at least some of said windings having first end surfaces and opposite second end surfaces, said first and second end surfaces having respective commutator surfaces;
   a stator disposed to magnetically interact with said rotor; and
   a first brush carrier positioned adjacent to at least some of said first end surfaces and a second brush carrier positioned adjacent to at least some of said second end surfaces, each brush carrier further comprising at least one brush, and wherein one of said brush carriers is rotated between about seventy and ninety degrees with respect to the other of said brush carriers such that at least one brush is aligned with one of said commutator surfaces.

21. A motor apparatus, comprising:
   a shaft;
   a rotor interconnected to said shaft, and including a winding;

a stator disposed to magnetically interact with said rotor;
a brush carrier having at least one air channel that directs airflow towards said winding and having at least two brushes; and
an endbell adjustably interconnected with said brush carrier such that adjustment of said brush carrier simultaneously adjusts said brushes in at least one circumferential direction with respect to said shaft.

22. The motor apparatus of claim 21 wherein said winding includes a conductive portion formed on a first end surface of said winding, and wherein said at least one air channel is positioned to direct airflow towards said end surface.

23. The motor apparatus of claim 22 wherein said winding includes a second conductive portion formed on a second end surface of said winding on an opposite side of said rotor, and wherein the motor apparatus further comprises a second brush carrier including at least one air channel in said second brush carrier to direct airflow towards said second end surface.

24. The motor apparatus of claim 21 wherein said endbell has at least one aperture to receive said brushes, and wherein said at least one aperture is dimensioned to allow adjustment of said brushes.

25. The motor apparatus of claim 24 wherein the number of apertures is equal to the number of brushes.

26. The motor apparatus of claim 21 wherein at least one of said endbell and said brush carrier includes at least one slot dimensioned to allow adjustment of said brush carrier such that said brushes are simultaneously adjusted in at least one circumferential direction with respect to said shaft.

27. The motor apparatus of claim 21 wherein said endbell includes at least one aperture to receive said brushes, and wherein said aperture allows for up to approximately five degrees of simultaneous adjustment of said brushes in at least one circumferential direction with respect to said shaft.

28. The motor apparatus of claim 21 wherein said brush carrier includes a brush holder, and wherein said air channel is formed within said brush holder.

29. The motor apparatus of claim 28 wherein said brush holder includes at least one sleeve that at least partially surrounds one of said brushes to absorb beat radiated from said one of said brushes and to dissipate heat through an air access passage.

30. The motor apparatus of claim 21 further comprising:
a fan interconnected with said shaft such that the rotation of said shaft causes said fan to rotate.

31. The motor apparatus of claim 21 further comprising:
an electric fan position to move air through said at least one air channel.

32. The motor apparatus of claim 21 wherein said rotor includes at least one conductive portion formed on a first end surface of said winding on a first side of said rotor and at least one second conductive portion formed on a second end surface of said winding on an opposite side of said rotor, wherein said at least one air channel further directs airflow across at least one of said first and said second end surfaces.

33. A motor apparatus, comprising:
a shaft;
a rotor interconnected to said shaft, and including a winding;
a stator disposed to magnetically interact with said rotor;
a brush carrier having at least two brushes and allowing simultaneous adjustment of said brushes in at least one circumferential direction with respect to said shaft; and
an endbell having at least one aperture to receive said at least two brushes, and wherein said at least one aperture is dimensioned to allow adjustment of said brushes.

34. The motor apparatus of claim 33 wherein the number of apertures is equal to the number of brushes.

35. The motor apparatus of claim 33 wherein each aperture is substantially polygonal.

36. The motor apparatus of claim 33 wherein at least one of said endbell and said brush carrier includes at least one slot dimensioned to allow adjustment of said brushes in at least one circumferential direction with respect to said shaft.

37. The motor apparatus of claim 36 wherein the other of said endbell and said brush carrier includes at least one aperture that receives a fastener.

38. The motor apparatus of claim 33 further comprising:
a second brush carrier having at least two brushes; and
a second endbell adjustably interconnected with said brush carrier such that adjustment of said second brush carrier simultaneously adjusts said brushes of said second brush carrier in at least one circumferential direction with respect to said shaft.

39. The motor apparatus of claim 33 wherein said at least one aperture allows for up to approximately five degrees of adjustment of said brush in at least one circumferential direction with respect to said shaft.

40. The motor apparatus of claim 33 wherein said brush carrier includes at least one air channel that directs airflow towards said winding.

41. The motor apparatus of claim 33 wherein said brush carrier includes a brush holder having an air channel that directs airflow towards said winding.

42. The motor apparatus of claim 41 wherein said brush holder includes at least one sleeve that at least partially surrounds one of said brushes to absorb heat radiated from said one of said brushes and to dissipate heat through an air access passage.

43. A motor apparatus, comprising:
a shaft;
a rotor interconnected to said shaft having radially extending conductive windings, at least some of said windings having first end surfaces and opposite second end surfaces;
a stator disposed to magnetically interact with said rotor; and
a first brush carrier positioned adjacent to at least some of said first end surfaces and a second brush carrier positioned adjacent to at least some of said second end surfaces such that at least one of said brush carriers further comprises at least one brush holder adjacent to an air channel, wherein each of said at least one brush holders has an air access passage in fluid flow communication with said air channel.

44. A motor apparatus, comprising:
a shaft;
a rotor interconnected to said shaft having radially extending conductive windings, at least some of said windings having first end surfaces and opposite second end surfaces;
a stator disposed to magnetically interact with said rotor;
a first brush carrier positioned adjacent to at least some of said first end surfaces and a second brush carriers positioned adjacent to at least some of said second end surfaces such that at least one of said brush carriers further comprises at least one brush holder adjacent to an air channel; and
a sleeve at least partially surrounded by said brush holder, said sleeve at least partially surrounding one brush to absorb and dissipate heat radiated from said brush through an air access passage.

* * * * *